(12) United States Patent
Mogami et al.

(10) Patent No.: US 7,954,612 B2
(45) Date of Patent: Jun. 7, 2011

(54) DRIVING-FORCE TRANSMISSION APPARATUS

(75) Inventors: Naoshi Mogami, Utsunomiya (JP); Isao Hirota, Kanuma (JP); Shouji Yoshida, Oyama (JP); Tomohiko Tezuka, Kawachi-gun (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 747 days.

(21) Appl. No.: 11/607,499

(22) Filed: Nov. 30, 2006

(65) Prior Publication Data

US 2008/0128234 A1 Jun. 5, 2008

Related U.S. Application Data (63) Continuation of application No. PCT/JP2006/310035, filed on May 19, 2006.

(51) Int. Cl.
*B60K 23/08* (2006.01)
*F16D 13/74* (2006.01)

(52) U.S. Cl. .................. 192/35; 192/70.12; 192/110 B; 192/113.34

(58) Field of Classification Search .................. 192/84.7
See application file for complete search history.

(56) References Cited

U.S. PATENT DOCUMENTS

| 4,642,985 | A | * | 2/1987 | Nozawa et al. | .......... 192/113.34 |
| 5,720,372 | A | | 2/1998 | Shino et al. | |
| 5,915,513 | A | * | 6/1999 | Isley et al. | ....................... 192/35 |
| 6,041,904 | A | | 3/2000 | Kuroda et al. | |
| 6,318,532 | B1 | * | 11/2001 | Gassmann | ....................... 192/35 |
| 6,454,068 | B2 | | 9/2002 | Arai et al. | |
| 7,210,565 | B2 | * | 5/2007 | Yamazaki et al. | ............... 192/35 |
| 2002/0134635 | A1 | * | 9/2002 | Teraoka et al. | .................. 192/35 |
| 2002/0142879 | A1 | | 10/2002 | Porter | |
| 2004/0074728 | A1 | * | 4/2004 | Sasse | ........................... 192/3.21 |
| 2005/0126285 | A1 | | 6/2005 | Kunii et al. | |

FOREIGN PATENT DOCUMENTS

| DE | 31 35 995 A1 | 3/1983 |
| DE | 198 00 349 C2 | 7/1998 |
| DE | 10 2004 047 329 A1 | 6/2005 |
| JP | 60-252026 | 12/1985 |
| JP | 01-204827 | 8/1989 |
| JP | 4-285357 A * | 10/1992 |
| JP | 06-043364 | 6/1994 |
| JP | 06-072726 | 10/1994 |
| JP | 10-196685 | 7/1998 |
| JP | 2000-193072 A1 | 7/2000 |
| JP | 2001-012507 | 1/2001 |
| JP | 2001-221264 | 8/2001 |
| JP | 2005-207578 | 8/2005 |

* cited by examiner

*Primary Examiner* — Rodney H Bonck (74) *Attorney, Agent, or Firm* — Morrison & Foerster LLP (57) ABSTRACT

An apparatus includes an input-side rotating member 2 driven by an engine (driving source) 90, an output-side rotating member 3 for driving an input member, such as a gear part 25 of a rear differential (driving-force distributing mechanism) 97 between wheels, a friction clutch 4 arranged between the input-side rotating member 2 and the output-side rotating member 3, a carrier housing (stationary member) 5 capable of accommodating the rear differential 97 and the friction clutch 4, an oil accommodating space (lubricant accommodating space) S formed in the stationary member 5 and an oil pump 6 driven by the output-side rotating member 3 to supply the friction clutch 4 with oil 600.

12 Claims, 9 Drawing Sheets

DRIVING-FORCE TRANSMISSION APPARATUS

CROSS-REFERENCE TO RELATED APPLICATIONS

This application is a continuation of International Application No. PCT/JP2006/310035, with an international filing date of May 19, 2006, the entire contents of which are incorporated by reference herein in its entirety.

TECHNICAL FIELD

The present invention relates to a driving-force transmission apparatus using a friction clutch.

BACKGROUND ART

Japanese Patent Laid-Open Publication No. 2001-12507 discloses a coupling for transmitting a driving force. This coupling is arranged in front of an input-side drive pinion of a differential between wheels. Again, this coupling transmits the driving force from an input side to the output side, corresponding to a clamping force of a multiplate friction clutch.

DISCLOSURE OF THE INVENTION

In the coupling as mentioned above, however, there are worries of abrasion of clutch plates and runout of oil since a frictional surface of the clutch is subjected to slippage in controlling the clamping force of the friction clutch.

An object of the present invention is to provide a driving-force transmission apparatus that suppresses such abrasion of clutch plates and runout of oil in view of improving its durability.

According to a main aspect of the present invention, a driving-force transmission apparatus comprises: an input-side rotating member driven by a driving source; an output-side rotating member having a coaxial structure with the input-side rotating member; friction clutch arranged between the input-side rotating member and the output-side rotating member stator; a stationary member having a coaxial structure with the input-side rotating member and being capable of accommodating the input-side rotating member, the output-side rotating member stator and the friction clutch; a lubricant accommodation space formed in the stationary member; and a pump for supplying the friction clutch with lubricant.

BEST MODE FOR CARRYING OUT THE INVENTION

Figure 1:
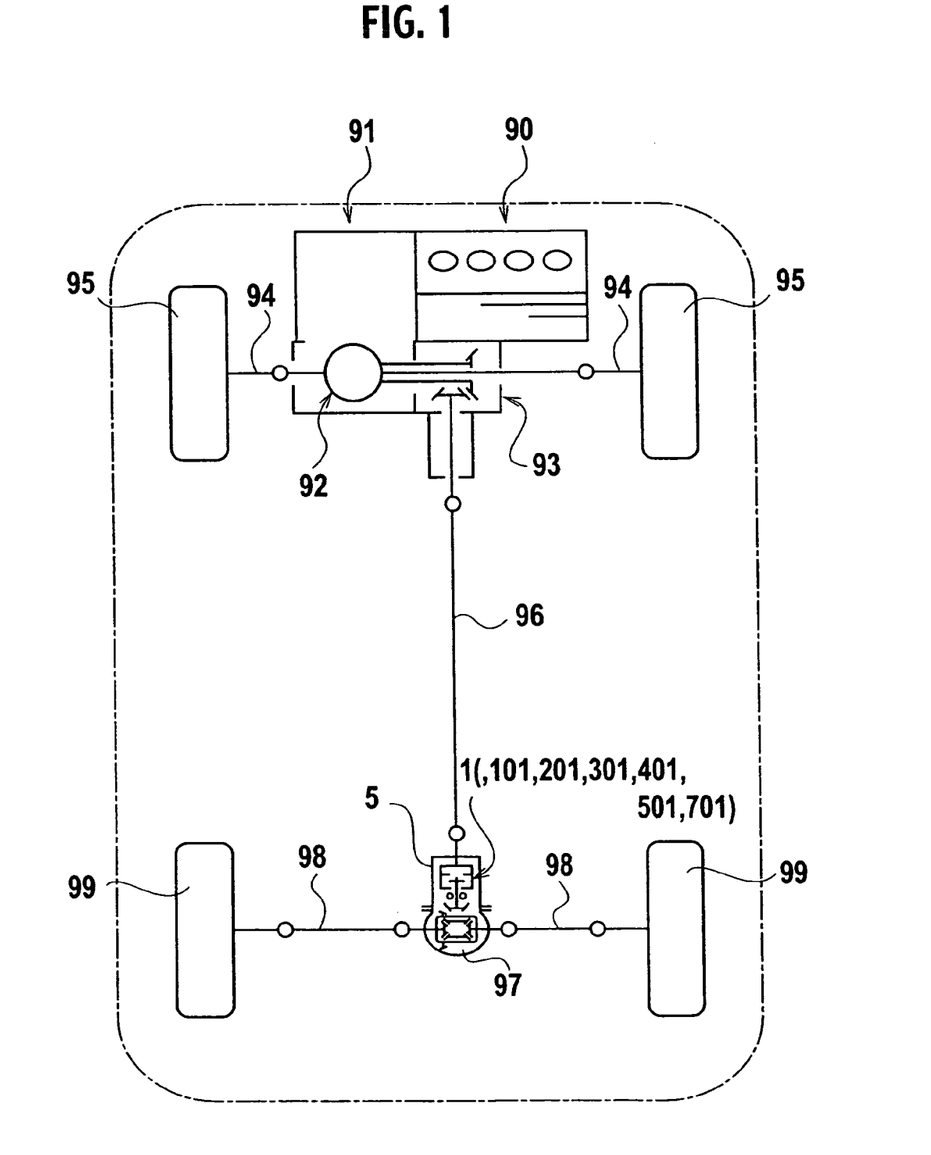
FIG. 1 is a schematic view of a vehicle power system related to the present invention.

Referring to FIG. 1, a vehicle power system on application of driving-force transmission apparatuses 1, 101, 201, 301, 401, 501, 701 will be described. Here, assume that the power system adopts the driving-force transmission apparatus 1.

The vehicle power system of FIG. 1 comprises a driver engine (driver) 90, a transmission 91, a front differential 92 (a differential unit for distributing a driving force of the driver to left and right front wheels), a transfer 93, front axles 94, 94, left and right front wheels 95, 95, a propeller shaft 96, the driving-force transmission apparatus 1, a rear differential 97 (a differential unit as one driving-force distribution mechanism for distributing the driving force of the driver to left and right rear wheels), rear axles 98, 98, left and right rear wheels 99, 99 and so on.

In the vehicle power system like this, the driving force of the engine 90 is transmitted to the front differential 92 through the transmission 91 and successively transmitted to the left and right front wheels 95, 95 through the front axles 94, 94. While, the driving force transmitted to the transfer 93 is transmitted to the driving-force transmission apparatus 1 through the propeller shaft 96. When the driving-force transmission apparatus 1 associates its front-wheel side with the rear-wheel side, the driving force is transmitted to the rear differential 97 and further transmitted to the left and right rear wheels 99, 99 through the rear axles 98, 98.

Thus, the driving-force transmission apparatus 1 is arranged between the front-wheel side and the rear-wheel side to transmit/cut off the driving force from the engine 90.

$1^{st}$. Embodiment

Figure 2:
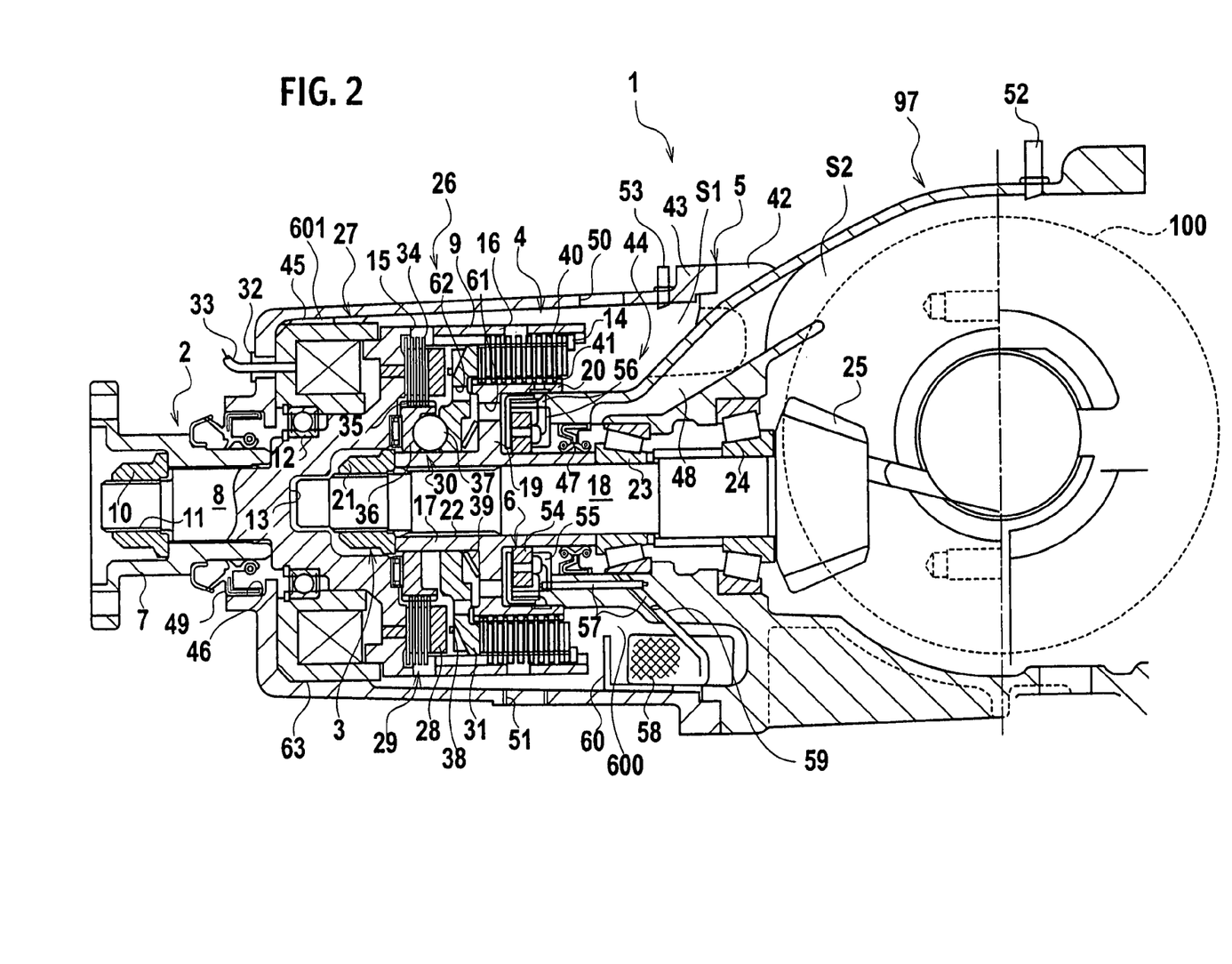
FIG. 2 is a sectional view of a driving-force transmission apparatus in accordance with a first embodiment of the present invention.

Referring to FIG. 2, the driving-force transmission apparatus of the first embodiment will be described.

The driving-force transmission apparatus 1 comprises an input-side rotating member 2 driven by the engine (drive source) 90, an output-side rotating member 3 for driving an input member of a later-mentioned gear part 25 of the rear differential (driving-force distribution mechanism) 97 between the wheels, a friction clutch 4 arranged between the input-side rotating member 2 and the output-side rotating member 3, a carrier housing (stationary member) 5 capable of accommodating the rear differential 97 and the friction clutch 4, lubricant 600 enclosed in a space (lubricant accommodation space) S defined by the stationary member 5 and a pump 6 driven by the output-side rotating member 3 to supply the friction clutch 4 with the lubricant. Again, as shown in FIG. 2, the input-side rotating member 2, the output-side rotating member 3 and the friction clutch 4 have coaxial structures with each other.

Note that, supposing oil as the lubricant, we hereinafter refer to the lubricant accommodation space S and the pump 6 as an oil accommodation space and an oil pump, respectively.

As shown in FIG. 2, the input-side rotating member 2 is formed by a propeller shaft flange 7, a shaft (first rotating member) 8 and a housing (first rotating member) 9.

The propeller shaft flange 7 is integrally attached to the shaft brake 8 by a nut 10 and a spline part 11 formed on an inner circumferential side of the nut. Again, the propeller shaft flange 7 is connected to a flange integrally attached to the propeller shaft 96 transmitting the driving force of the engine 90 and transmits the driving force to the shaft 8.

The shaft 8 is rotatably supported by an electromagnet (operation source) 27 whose outer circumference is fixed to the carrier housing 5 through a bearing 12. The shaft 8 is formed, on its inside in the axial direction and its inner-diameter side, with a recess 13 into which one end of a drive pinion shaft 18 of the rotating member 3 is accommodated. Again, the shaft 8 is connected, on its inside in the axial direction and its outer-diameter side, with the housing 9. In addition, for connecting means between the shaft 8 and the housing 9, there is conceivable means, such as welding between these members or casting/form rolling for single-piece, etc. For material for the connecting means, we can suppose structural carbon-steel products, casting aluminum alloys, carbon materials and so on.

The housing 9 is spline-connected, on its one side in the axial direction and its inner-diameter side, with outside clutch discs 34 of a pilot clutch (friction clutch) 29 of an intermittent mechanism 26. Also, the housing 9 is spline-connected, on the other side in the axial direction and its inner-diameter side, with outside clutch discs 40 of a main clutch (friction clutch) 4 of the intermittent mechanism 26. On an end of the main clutch 4 positioned on the inner-diameter side of the housing 9 and its axial other side, a clip ring 14 is arranged to restrict a moving of the clutch to the axial other side. Again, the housing 9 is formed with holes 15, 16 through which oil for lubricating the pilot clutch 29 and the main clutch 4 flows in. Since the pilot clutch 29 and the main clutch 4 are fastened together, the driving force is transmitted from the input-side rotating member 2 to the output-side rotating member 3.

The output-side rotating member 3 is formed by a hub (second rotating member) 17 and a drive pinion shaft (second rotating member) 18.

The hub 17 is formed, at its axial intermediate part and on its outer circumferential side, with an annular wall part 19. The wall part 19 is formed, on its outer circumferential side, with a spline part 20 extending in the axial direction of the hub. In the main clutch 4, inside clutch discs 41 are spline-connected to the spline part 20. A cam ring 36 of a cam mechanism 30 is arranged on the outer circumference of one side of the hub 17 in the axial direction. Further, the drive pinion shaft 18 is spline-connected to the inner circumference of the hub 17 on one side in the axial direction and fixed to the hub 17 by a nut 21.

The drive pinion shaft 18 has its one end accommodated in the recess 13 of the shaft 8. Again, on one side of the drive pinion shaft 18, a spline part 22 is formed on the outer circumference of the same shaft and is spline-connected to the hub 17. A pair of taper roller bearings (bearing parts) 23, 24 come into contact with the outer circumference of the other side of the drive pinion shaft 18. The drive pinion shaft 18 is rotatably supported by the carrier housing 5 through the taper roller bearings 23, 24 in pairs. Additionally, a gear part 25 is integrally formed on the other end of the drive pinion shaft 18. The gear part 25 meshes with a ring gear part 100 of the rear differential 97 and transmits a driving force of the output-side rotating member 3 to the rear differential 97, having a function as an input member.

In the input-side rotating member 2 and the output-side rotating member 3 constructed above, when the input-side rotating member 2 is connected to the output-side rotating member 3 by the intermittent mechanism 26, a driving force is transmitted from the input-side rotating member 2 to the output-side rotating member 3, so that this driving force is transmitted to the left and right wheels through the rear differential 97 connected to the output-side rotating member 3.

The intermittent mechanism of the present invention is composed of a friction clutch and an actuator for operating the friction clutch. In this embodiment, the intermittent mechanism 26 particularly includes an electromagnet 27, an armature 28 which is arranged so as to be movable in the axial direction by a magnetic attraction of the electromagnet 27, the pilot clutch (friction clutch) 29 which is fastened by an axial movement of the armature 28, a cam mechanism 30 generating a thrust force by the fastening of the pilot clutch 29 and the main clutch (friction clutch) 4 which is fastened to an actuator consisting of an annular pressure ring 31 transmitting the thrust force of the cam mechanism 30 to the main clutch 4. With this constitution, the intermittent mechanism 26 connects and disconnects the input-side rotating member 2 to and from the output-side rotating member 3.

The electromagnet 27 is fixed on the carrier housing 5 and supports the shaft 8 through the bearing 12. Again, the electromagnet 27 has a lead wire 33 connected thereto and drawn out of the carrier housing 5 through a grommet 32. The electromagnet 27 is supplied with power through the lead wire 33. The armature 28 is made from magnetic material and is arranged on one side of the electromagnet 27 through the pilot clutch 29.

The pilot clutch 29 comprises the plural outside clutch discs 34 spline-connected to the inner circumference of the housing 9 and a plurality of inside clutch discs 35 spline-connected to the outer circumference of the cam ring 36 fitted to the outer circumference of the hub 17. The pilot clutch 29 is arranged between the electromagnet 27 and the armature 28. When supplying the electromagnet 27 with electricity, the pilot clutch 29 is fastened since the electromagnet 27 under its excited state attracts the armature 28, allowing the cam mechanism 30 to generate a cam thrust force due to a differential rotation between the cam ring 36 and the pressure ring 31.

The cam mechanism 30 includes the cam ring 36, the pressure ring 31 arranged on the outer circumference of the hub 17 and a cam ball 37 arranged between the cam ring 36 and the pressure ring 31. When the pilot clutch 29 is fastened, there is produced a differential rotation between the cam ring 36 connected to the pilot clutch 29 and the pressure ring 31, so that the resulting cam thrust force of the cam mechanism 30 causes the pressure ring 31 to be moved toward the main clutch 4 for its fastening. In addition, the pressure ring 31 is provided, on its surface opposing the armature 28, with a projection 38 for reducing a contact area with the armature 38 or providing a predetermined interval. Further, a conical spring 39 is arranged between the pressure ring 31 and the wall part 19 of the hub 17 to urge the pressure ring 31 toward the pilot clutch 29.

The main clutch 4 is formed by the plural outside clutch discs 40 spline-connected to the inner circumference of the housing 9 and the plural inside clutch discs 41 spline-connected to the spline part 20 of the hub 17. The main clutch 4 is fastened by the pressure ring 31 that has been moved toward the main clutch 4 due to the fastening of the pilot clutch 29. When the main clutch 4 is fastened, the housing 9 (the input-side rotating member 2) and the hub 17 (the output-side rotating member 3) are connected with each other, so that the driving force from the input-side rotating member 2 is transmitted to the left and right wheels through the rear differential 97.

The input-side rotating member 2, the output-side rotating member 3, the intermittent mechanism 26 and the rear differential 97 all mentioned above are accommodated in the carrier housing 5.

The carrier housing 5 is formed by a carrier body 42 and a carrier cover 43. The rear differential 97 is accommodated in the carrier body 42. The carrier body 42 is provided, on one side thereof, with a cylindrical part 44. The hub 17 and the drive pinion shaft 18 are inserted into an inner circumferential side of the cylindrical part 44. The intermittent mechanism 26 is accommodated in the carrier cover 43. In the intermittent mechanism 26, the electromagnet 27 is non-rotatably fixed on one or more concave portions 601, which are formed around the inner circumferential surface of the carrier cover 43, by a whirl-stop 45 formed by means of welding etc. Again, the carrier cover 43 is provided, on one side thereof, with a bore part 46. The flange 7 and the shaft 8 of the propeller shaft are inserted into the bore part 46.

The carrier housing 5, which is formed by the carrier body 42 and the carrier cover 43 like this, forms the oil accommodation space S enclosing the oil 600.

A compartment seal 47 is arranged between the inner circumference of the cylindrical part 44 of the carrier body 42 and the outer circumference of the hub 17. The compartment seal (seal member) 47 separates oil enclosed in the carrier body 42 from oil enclosed in the carrier cover 43. Thus, the compartment seal 47 divides the oil accommodation space S provided in the carrier housing 5 into a first oil accommodation space S2 for enclosing the oil in the carrier body 42 and a second oil accommodation space S1 for enclosing the oil in the carrier cover 43. That is, there exists a relationship of S=S1+S2. The same is equally true of subsequently-mentioned embodiments (except the second embodiment and the seventh embodiment).

The carrier body 42 is formed, on its side close to the compartment seal 47, with an oil passage 48 for flowage of oil. One pair of taper roller bearings 23, 24 for supporting the drive pinion shaft 18 are lubricated by the oil passage 48.

A seal 49 is arranged between the inner circumference of the bore part 46 of the carrier cover 43 and the outer circumference of the flange 7 of the propeller shaft. The seal 49 seals up the carrier housing 5. A filler hole 50 is formed in an upper part of the carrier cover 43. The oil is infused into the carrier housing 5 through the filler hole 50 and the carrier housing 5 is sealed up by a filler plug (not shown). Again, the carrier cover 43 is formed, in its lower part, with a drain hole 51 which is sealed up by a drain plug (not shown). The oil is discharged from the drain hole 51. The enclosed oil is circulated by an oil pump 6 arranged in the carrier housing 5. In addition, breathers 52, 53 as means for suppressing a rise of inside pressure are arranged in the carrier body 42 and the carrier cover 43, respectively.

The oil pump 6 is arranged at a tip side of the cylindrical part 44 of the carrier body 42. The oil pump 6 is formed by a rotor (driving part) 54 and a stator 55. The rotor 54 is connected to the outer circumference of the hub 17 and is rotated by rotating of the hub 17 integrally. The stator 55 is fixed to the tip side of the cylindrical part 44 of the carrier body 42. The stator 55 is formed with a discharge passage 56. Additionally, a suction passage 57 is formed in a lower part of the cylindrical part 44 of the carrier body 42. The suction passage (oil introduction passage) 57 is communicated with the oil pump 6 and is connected with a strainer 58, which is arranged in a lower part of the carrier housing 5, through a suction pipe 59. The strainer 58 filters out dust mixed into the oil. A baffle plate 60 is arranged in the vicinity of the strainer 58. Although the baffle plate 60 is provided, as a matter of first priority, to perform a commutating action so that the oil in the strainer 58 is not influenced by eddy flow caused by the rotation of the driving-force transmission apparatus 1, the baffle plate 60 has also a function to prevent dust etc. mixed in the oil gathering near the strainer 58 from scattering circumferentially. In the hub 17, the wall part 19 adjacent to the oil pump 6 is formed with a hole 61 that the oil flows in. In addition, the pressure ring 31 adjacent to the wall part 19 of the hub 17 is formed with a hole 62 that the oil flows in. Note that a notch passage 63 for oil circulation is formed between the carrier housing 5 and the electromagnet 27.

In the oil pump 6 like this, the oil is sucked from the strainer 58 through the suction passage 57 by the rotor 54 integrally rotated by the rotation of the hub 17. Then, the so-sucked oil is discharged through the discharge passage 56. Again, the sucked oil is supplied to the hole 61 in the wall part 19 of the hub 17 and the hole 62 of the pressure ring 31. By the discharge passage 56 and the holes 61, 62, the oil sucked in the oil pump 6 is supplied to the main clutch 4 and the pilot clutch 29, lubricating them certainly.

Next, we explain an assembling procedure of the driving-force transmission apparatus 1.

(1) First, arrange the compartment seal 47 and the oil pump 6 on the side of the carrier housing 5. Next, combine the drive pinion shaft 18 and the hub 17 and unit them by the nut 21. (2) Next, incorporate a sub-assembly consisting of the main clutch 4, the pressure ring 31, the pilot clutch 29 and the cam mechanism 30 into the combination of (1). (3) Next, combine the electromagnet 27 and the bearing 12 with the combination of (2). (4) Combine the carrier cover 43 and the combination of (3). (5) Finally, combine the flange 7 of the propeller shaft and the combination of (4) and the assembling is completed.

In the driving-force transmission apparatus 1 like this, since it is equipped with the oil pump 6 driven by the hub 17 in order to supply the main clutch 4 and the pilot clutch 29 with oil, it is possible to supply the main clutch 4 and the pilot clutch 29 with oil certainly, restricting both abrasion of the main clutch 4 and the pilot clutch 29 and their running short of oil.

Additionally, as the oil pump 6 comprises the rotor 54 driven by the hub 17 and the stator 55 fixed to the carrier housing 5, the oil pump 6 is driven by absolute number of revolutions of the hub 17, allowing an oil supply corresponding to the drive of the rotating shaft. Additionally, it is possible to supply the main clutch 4 and the pilot clutch 29 with oil actively. In connection, if blocking off a part of the suction passage 57 by a valve, a centrifugal weight or the like, then it is possible to allow the oil pump 6 to rotate with no additional resistance under a condition more than a predetermined rotating range, that is, power loss of the oil pump can be suppressed.

Additionally, since the oil pump 6 is arranged against the tip side of the cylindrical part 44 of the carrier housing 5, such an opened tip side of the cylindrical part 44 facilitates an attachment of the oil pump 6 without being blocked by a rotating member, a stationary member and so on.

Again, as the oil accommodation space S defined by the carrier housing 5 is divided off by the compartment seal 47 (S=S1+S2) and the oil pump 6 is arranged in the first oil accommodation space S1 containing the main clutch 4 and the pilot clutch 29, it is possible to define the volume of a accommodation space for the main clutch 4 and the pilot clutch 29 and also possible to stabilize the oil supply for the friction clutch while excluding the influence of variations in the quantity of oil on the side of the rear differential 97.

2nd. Embodiment

A driving-force transmission apparatus in accordance with the second embodiment will be explained with reference to FIG. 3.

In the driving-force transmission apparatus 101 of this embodiment, an oil pump 106 is arranged on an inner circumferential side of a cylindrical part 144 of a carrier housing 105 and is arranged between one pair of taper roller bearings (bearings) 23, 24. Note that as the other constitution of the apparatus is identical to that of the driving-force transmission apparatus 1 of the first embodiment of FIG. 2, constituents are indicated with the same reference numerals of the constituents of the apparatus 1 respectively, and explanations about the constituents are eliminated.

Figure 3:
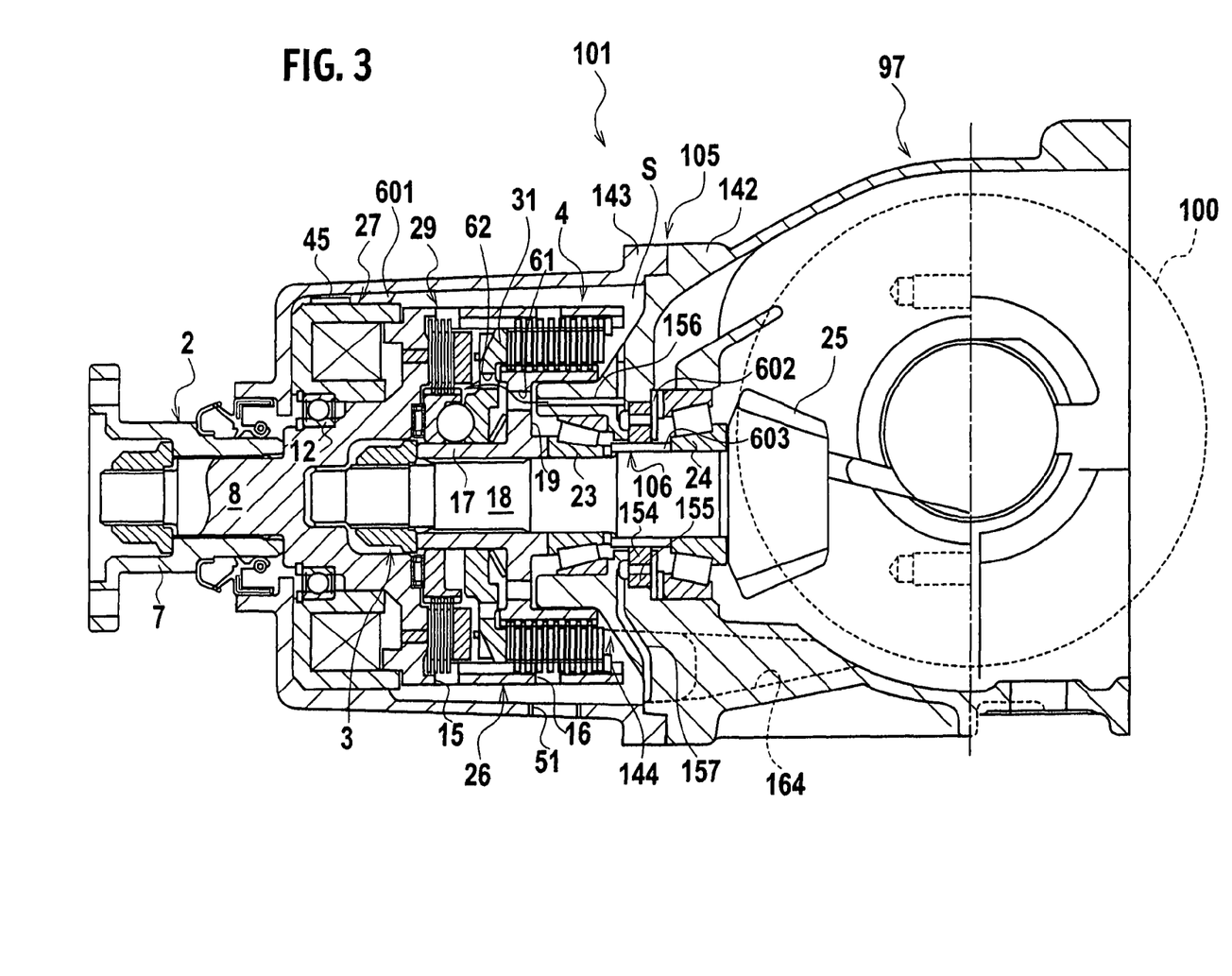
FIG. 3 is a sectional view of a driving-force transmission apparatus in accordance with a second embodiment of the present invention.

As shown in FIG. 3, the oil pump 106 is arranged on the inner circumferential side of the cylindrical part 144 of a carrier body 142. Again, on the inner circumferential side of the cylindrical part 144, the pair of taper roller bearings 23, 24 are arranged to support the drive pinion shaft 18. The oil pump 106 is arranged between the taper roller bearings 23, 24 in pairs. In addition, since no compartment seal is arranged in the oil accommodation space S of a carrier housing 105, oil enclosed in the second oil accommodation space S1 of a carrier cover 143 is identical to that enclosed in the first oil accommodation space S2 of the carrier body 142. That is, the oil is shared for both differential lubricating oil and coupling lubricating oil.

The oil pump 106 is formed by a rotor 154 and a stator 155. The rotor 154 is connected onto a bearing spacer 603 on the outer circumference of the drive pinion shaft 18 and is rotated by the rotation of the drive pinion shaft 18 integrally. The stator 155 is fixed on the inner circumference of the cylindrical part 144 of the carrier body 142. Between one axial side of the bearing 24 and the oil pump 106, a wall member 602 is arranged to define both arrangement and functional space of the oil pump 106 together with the carrier body 142. Additionally, a suction passage (oil introduction passage) 157 is formed in a lower part of the cylindrical part 144 of the carrier body 142. The suction passage 157 is communicated with the oil pump 106 and is connected with a lower space of the carrier housing 105. The lower part of the cylindrical part 144 is provided, therein, with a communication passage 164 that communicates the first oil accommodation space S2 of the carrier body 142 with the second oil accommodation space S1 of the carrier cover 143. In the upper part of the cylindrical part 144, additionally, a discharge passage 156 is formed to communicate with the oil pump 106. An opening side of the discharge passage 156 is adjacent to the hole 61 in the wall part 19 of the hub 17.

In the oil pump 106 like this, oil is sucked through the suction passage 157 by the rotor 154 rotated by the rotation of the drive pinion shaft 18 integrally. As represented by an oil current shown with arrow of FIG. 3, the sucked oil is discharged through the discharge passage 156. The so-discharged oil is supplied to the hole 61 of the wall part 19 of the hub 17 and the hole 62 of the pressure ring 31. Through the intermediary of the discharge passage 156 and the holes 61, 62, the oil sucked in the oil pump 106 is supplied to the main clutch 4 and the pilot clutch 29. In this way, the main clutch 4 and the pilot clutch 29 are lubricated certainly.

In the driving-force transmission apparatus 101 constructed above, as it is easy to form an inner circumferential wall in the cylindrical part 144 of the carrier housing 105, it is possible to arrange the oil pump 106 with ease. Additionally, in an arrangement where the oil pump 106 is arranged on the outer circumferential side of the cylindrical part 144, it would be easy to supply the rotating member, the actuator and the friction clutch with oil. Additionally, it would be easy to provide a passage to suck in oil in the carrier housing 105 or possible to suck in oil directly.

Further, since the layout space for the oil pump 106 is established between one pair of taper roller bearings 23, 24, it is possible to suppress a tendency for a long and massive driving-force transmission apparatus.

3rd. Embodiment

A driving-force transmission apparatus in accordance with the third embodiment will be explained with reference to FIG. 4.

In the driving-force transmission apparatus 201 of this embodiment, an oil pump 206 is arranged on an inner circumferential side of a cylindrical part 244 of a carrier housing 205 and is arranged between one pair of taper roller bearings (bearings) 23, 24. Note that as the other constitution of the apparatus is identical to that of the driving-force transmission apparatus 1 of the first embodiment of FIG. 2, constituents are indicated with the same reference numerals of the constituents of the apparatus 1 respectively, and explanations about the constituents are eliminated.

Figure 4:
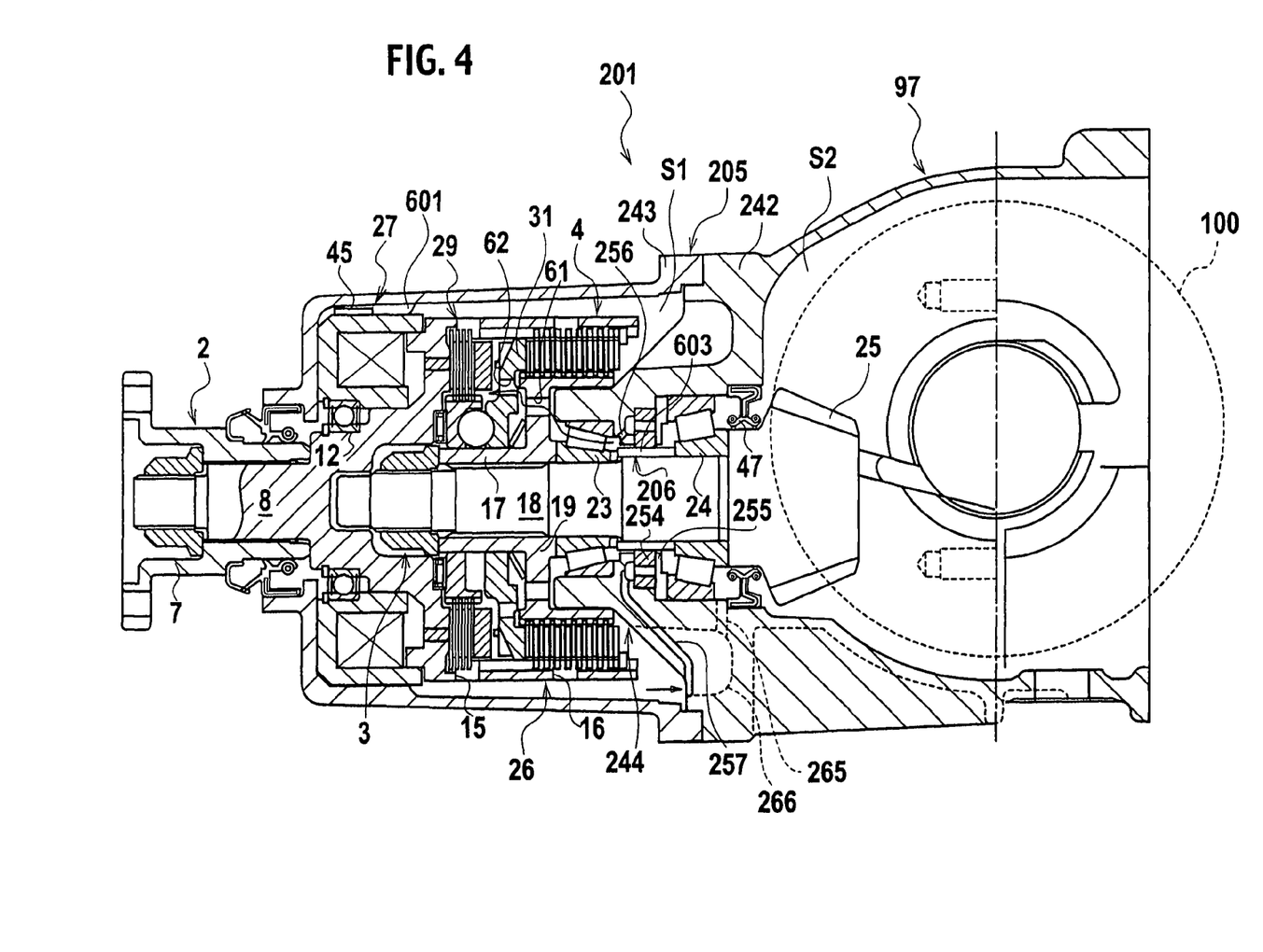
FIG. 4 is a sectional view of a driving-force transmission apparatus in accordance with a third embodiment of the present invention.

As shown in FIG. 4, the oil pump 206 is arranged on the inner circumferential side of the cylindrical part 244 of a carrier body 242. Again, on the inner circumferential side of the cylindrical part 244, the pair of taper roller bearings 23, 24 are arranged to support the drive pinion shaft 18. The oil pump 106 is arranged between the taper roller bearings 23, 24 in pairs. On the inner circumferential side of the cylindrical part 244, additionally, the compartment seal 47 is arranged between the taper roller bearing 24 and the gear part 25.

The oil pump 206 is formed by a rotor 254 and a stator 255. The rotor 254 is connected onto the bearing spacer 603 on the outer circumference of the drive pinion shaft 18 and is rotated by the rotation of the drive pinion shaft 18 integrally. The stator 255 is fixed on the inner circumference of the cylindrical part 244 of the carrier body 242. Additionally, a suction passage (oil introduction passage) 257 is formed in a lower part of the cylindrical part 244 of the carrier body 242. The suction passage 257 is communicated with the oil pump 206 and is connected with a lower space of the carrier housing 205. The lower part of the cylindrical part 244 is provided, therein, with a communication passage 265 that communicates with the second oil accommodation space S1 accommodating the friction clutch laid out by the compartment seal 47. The lower end of the communication passage 265 is communicated with a suction passage 266 formed in the carrier housing 205. The communication passage 265 suppresses a rise in pressure of a space between the taper roller bearing 24 and the compartment seal 47. In the upper part of the cylindrical part 244, additionally, a discharge passage 256 is formed to communicate with the oil pump 206. An opening side of the discharge passage 256 is adjacent to the taper roller bearing 23.

In the oil pump 206 like this, oil is sucked through the suction passage 257 by the rotor 254 rotated by the rotation of the drive pinion shaft 18 integrally. As represented by an oil current shown with arrow of FIG. 4, the sucked oil is discharged through the discharge passage 256. The so-discharged oil is supplied to the taper roller bearing 23 and is effectively supplied to the hole 61 of the wall part 19 of the hub 17 and the hole 62 of the pressure ring 31 at a discharge flow rate increased by a centrifugal pump effect of the taper roller bearing 23. Through the intermediary of the discharge passage 256 and the holes 61, 62, the oil sucked in the oil pump 206 is supplied to the main clutch 4 and the pilot clutch 29. In this way, the main clutch 4 and the pilot clutch 29 are lubricated certainly.

In the driving-force transmission apparatus 201 like this, as the oil accommodation space S defined by the carrier housing 205 is divided off by the compartment seal 47 (S=S1+S2) and the oil pump 206 is arranged in the second oil accommodation space S1 containing the main clutch 4 and the pilot clutch 29, it is possible to define the volume of a accommodation space for the main clutch 4 and the pilot clutch 29 and also possible to stabilize the oil supply for the friction clutch while excluding the influence of variations in the quantity of oil on the side of the rear differential 97.

Further, as an opening side of the discharge passage 256 is adjacent to the taper roller bearing 23, it is possible to stabilize not only oil supply to the friction clutch but also oil supply to the taper roller bearing 23.

4$^{th}$. Embodiment

A driving-force transmission apparatus in accordance with the fourth embodiment will be explained with reference to FIG. 5.

In the driving-force transmission apparatus 301 of this embodiment, an oil pump 306 is arranged on an inner circumferential side of a cylindrical part 344 of a carrier housing 305 and is arranged between one pair of taper roller bearings (bearings) 23, 24. Note that as the other constitution of the apparatus is identical to that of the driving-force transmission apparatus 1 of the first embodiment of FIG. 2, constituents are indicated with the same reference numerals of the constituents of the apparatus 1 respectively, and explanations about the constituents are eliminated.

Figure 5:
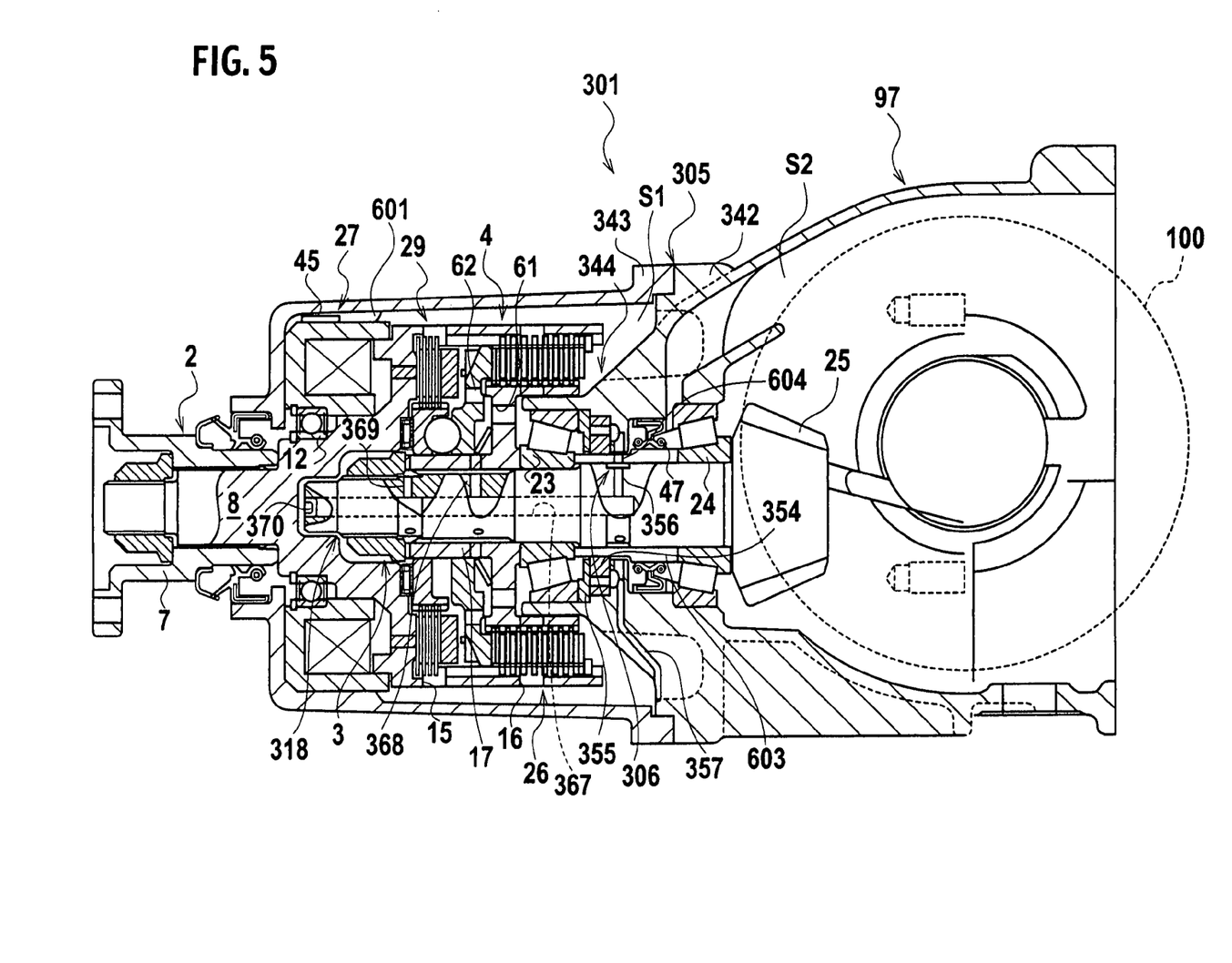
FIG. 5 is a sectional view of a driving-force transmission apparatus in accordance with a fourth embodiment of the present invention.

As shown in FIG. 5, the oil pump 306 is arranged on the inner circumferential side of the cylindrical part 344 of a carrier body 342. Again, on the inner circumferential side of the cylindrical part 344, the pair of taper roller bearings 23, 24 are arranged to support the drive pinion shaft 18. The oil pump 306 is arranged between the taper roller bearings 23, 24 in pairs. The compartment seal 47 is arranged between the oil pump 306 on the inner circumference of the cylindrical part 344 and the taper roller bearing 24. That is, the taper roller bearing 24 is lubricated by oil enclosed in the rear differential 97.

The oil pump 306 is formed by a rotor 354 and a stator 355. The rotor 354 is connected onto the bearing spacer 603 on an outer circumference of a drive pinion shaft 318 and is rotated by the rotation of the drive pinion shaft 318 integrally. The stator 355 is fixed on the inner circumference of the cylindrical part 344 of the carrier body 342. Additionally, a suction passage (oil introduction passage) 357 is formed in a lower part of the cylindrical part 344 of the carrier body 342. The suction passage 357 is communicated with the oil pump 306 and is connected with a lower space of the carrier housing 305. Further, in a discharge passage of the oil pump 306, a hole 604 formed in the bearing spacer 603 and a radial hole 356 formed in the drive pinion shaft 318 as the output-side rotating member 3 are communicated with an oil passage (axial lubricating passage) 367 formed in a rotational core part of the drive pinion shaft 318 along its axial direction. Additionally, the drive pinion shaft 318 has radial discharge passages (radial lubricating passages) 368, 369 formed in communication with the oil passage 367 to supply the mail clutch 4 and the pilot clutch 29 with oil. A seal plug 370 is arranged at an opening end of the oil passage 367.

In the oil pump 306 like this, oil is sucked through the suction passage 357 by the rotor 354 rotated by the rotation of the drive pinion shaft 318 integrally. The sucked oil flows from the hole 604 as the discharge passage to the radial hole 356 and is belched into the oil passage 367. The oil belched into the oil passage 367 is discharged from the discharge passages 368, 369 due to the rotation of the drive pinion shaft 318. By the discharge passages 368, 369, the oil sucked in the oil pump 306 is supplied to the main clutch 4 and the pilot clutch 29. In this way, the main clutch 4 and the pilot clutch 29 are lubricated certainly.

In the driving-force transmission apparatus 301 like this, the oil accommodation space S defined by the carrier housing 305 is divided off by the compartment seal 47 (S=S1+S2), and the compartment seal 47 is arranged between the pair of taper roller bearings 23, 24. With this arrangement, it is possible to lubricate the taper roller bearing 24 by the oil in the rear differential 97 and also possible to stabilize the oil supply for the friction clutch while excluding the influence of variations in the quantity of oil on the side of the rear differential 97.

Again, since the oil passes through the discharge passage 356 and the oil passage 367 at the core part of the drive pinion shaft 318 and is discharged from the discharge passages 368, 369 formed in the oil passage 367, it is possible to make use of rotation of the drive pinion shaft 318 and also possible to stabilize the oil supply to the friction clutch.

Additionally, since the oil passage 367 is formed in the axial core part of the drive pinion shaft 318 as the rotating member in the axial direction, it is possible to supply oil to the main clutch 4 and the pilot clutch 429 through the discharge passages 368, 369 communicated with the oil passage 367, allowing the lubrication to be effected more reliably.

5$^{th}$. Embodiment

A driving-force transmission apparatus in accordance with the fifth embodiment will be explained with reference to FIG. 6.

In the driving-force transmission apparatus 401, one of bearings in pairs, which is positioned on the side of the main clutch 4 and the pilot clutch 29, is formed by a conical roller bearing 471. An oil pump 406 includes this conical roller bearing (which may be referred to as "taper roller bearing") 471. Note that the other constitution of the apparatus is identical to that of the driving-force transmission apparatus 1 of the first embodiment of FIG. 2 and therefore, constituents are indicated with the same reference numerals of the constituents of the apparatus 1 respectively, and explanations about the constituents are eliminated.

Figure 6:
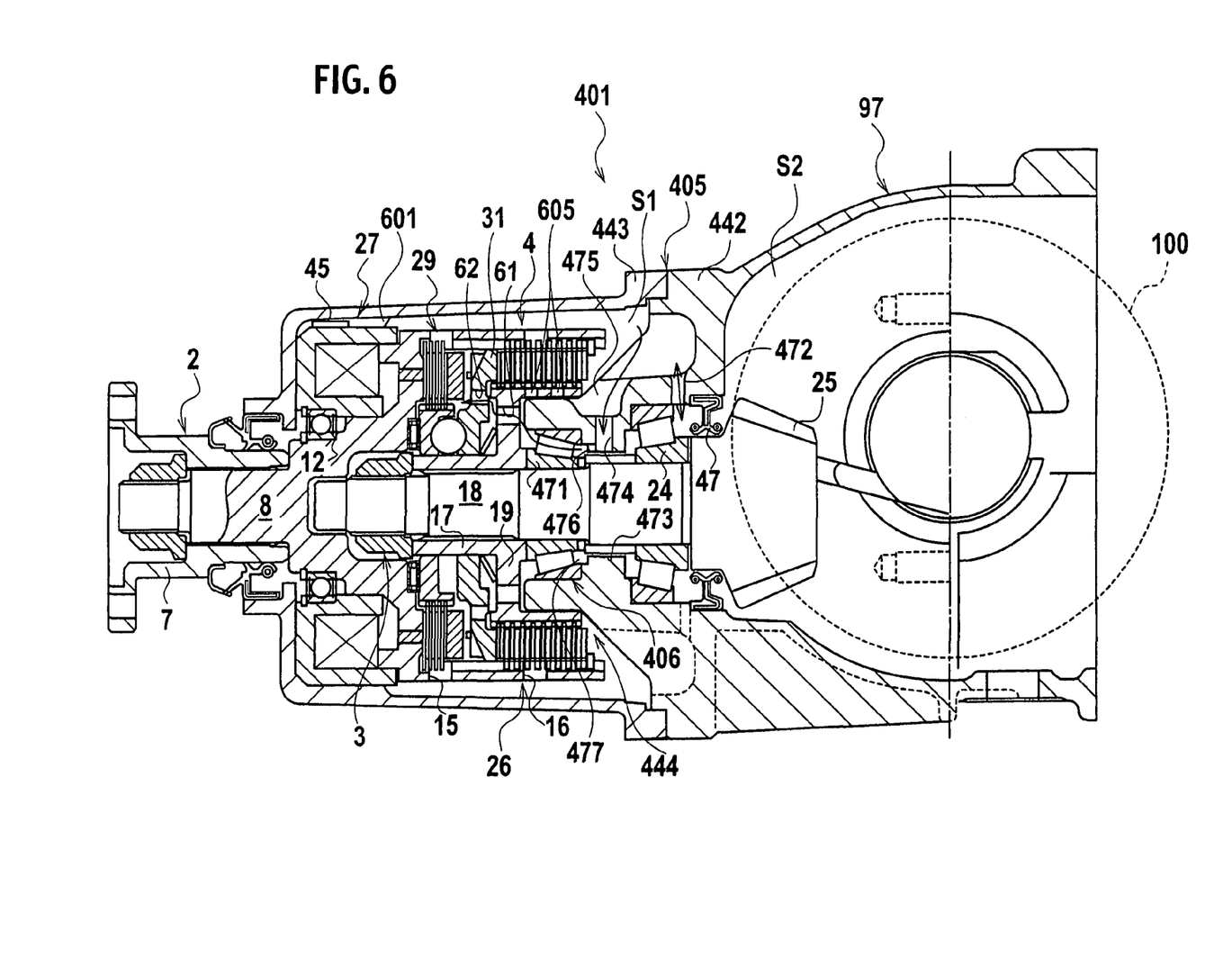
FIG. 6 is a sectional view of a driving-force transmission apparatus in accordance with a fifth embodiment of the present invention.

As shown in FIG. 6, the oil pump 406 includes the conical roller bearing 471 arranged on the inner circumferential side of a cylindrical part 444 of a carrier body 442. The conical roller bearing 471 supports the drive pinion shaft 18 together with the bearing 24 being a conical roller bearing as well and has a function to supply the main clutch 4 and the pilot clutch 29 with oil. On the inner circumferential side of the cylindrical part 444, the bearing 24 is arranged on the side of the rear differential 97. The compartment seal 47 is arranged on one side of the bearing 24 close to the rear differential 97.

The cylindrical part 444 is formed, at its interior part between the bearing 24 and the compartment seal 47, with an oil flow path 472. Again, the cylindrical part 444 is provided, on its inner circumference between the oil pump 406 (the conical roller bearing 471) and the bearing 24, with an intermediate wall part 473. A suction passage 474 is formed on an upper side of the intermediate wall part 473 in the vertical direction. An oil reservoir 475 is formed above the suction passage 474. Again, in a side wall orientated to an axial center of the suction passage (oil introducing passage) 474, there is formed a notch 476 providing a suction passage opposing the conical roller bearing 471. Further, an oil reservoir 477 is formed between the intermediate wall part 473 of the cylindrical part 444 and the conical roller bearing 471.

In the so-formed oil flow path as a suction passage on the suction side, oil scooped up by rotation of the rotating member is pooled in the oil reservoir 475. Then, as shown with arrow of FIG. 6, the oil in the oil reservoir 475 is introduced into the suction passage 474 and further supplied from the oil reservoir 477 to the conical roller bearing 471. The so-supplied oil is delivered to the hole 61 of the wall part 19 of the hub 17, the hole 62 of the pressure ring 31 and holes 605 of the hub 17 on the inner circumferential side of the main clutch 4 due to centrifugal pump action by rotation of the conical roller bearing 471. Owing to the oil delivered from the conical roller bearing 471 toward the holes 61, 62 and 605, the oil sucked in the oil pump 406 is supplied to the main clutch 4 and the pilot clutch 29. In this way, the main clutch 4 and the pilot clutch 29 are lubricated certainly.

According to the drive-force transmission apparatus 401 constructed above, as the oil pump 406 (the conical roller bearing 471) also acts as a bearing, the oil supply for the friction clutch can be accomplished without providing any special bearing and increasing the number of constituents, that is, with a simple and reliable structure.

6$^{th}$. Embodiment

A driving-force transmission apparatus in accordance with the fifth embodiment will be explained with reference to FIG. 7.

In the driving-force transmission apparatus 501, an oil pump 506 is arranged between the input-side rotating member 2 and a carrier housing (stationary member) 505. Further, the oil pump 506 is arranged radially inside of an inner circumference of an end wall 578 and also arranged so as to overlap with the end wall 578 at least partially in the radial direction. Note that the other constitution of the apparatus is identical to that of the driving-force transmission apparatus 1 of the first embodiment of FIG. 1 and therefore, constituents are indicated with the same reference numerals of the constituents of the apparatus 1 respectively, and explanations about the constituents are eliminated.

Figure 7:
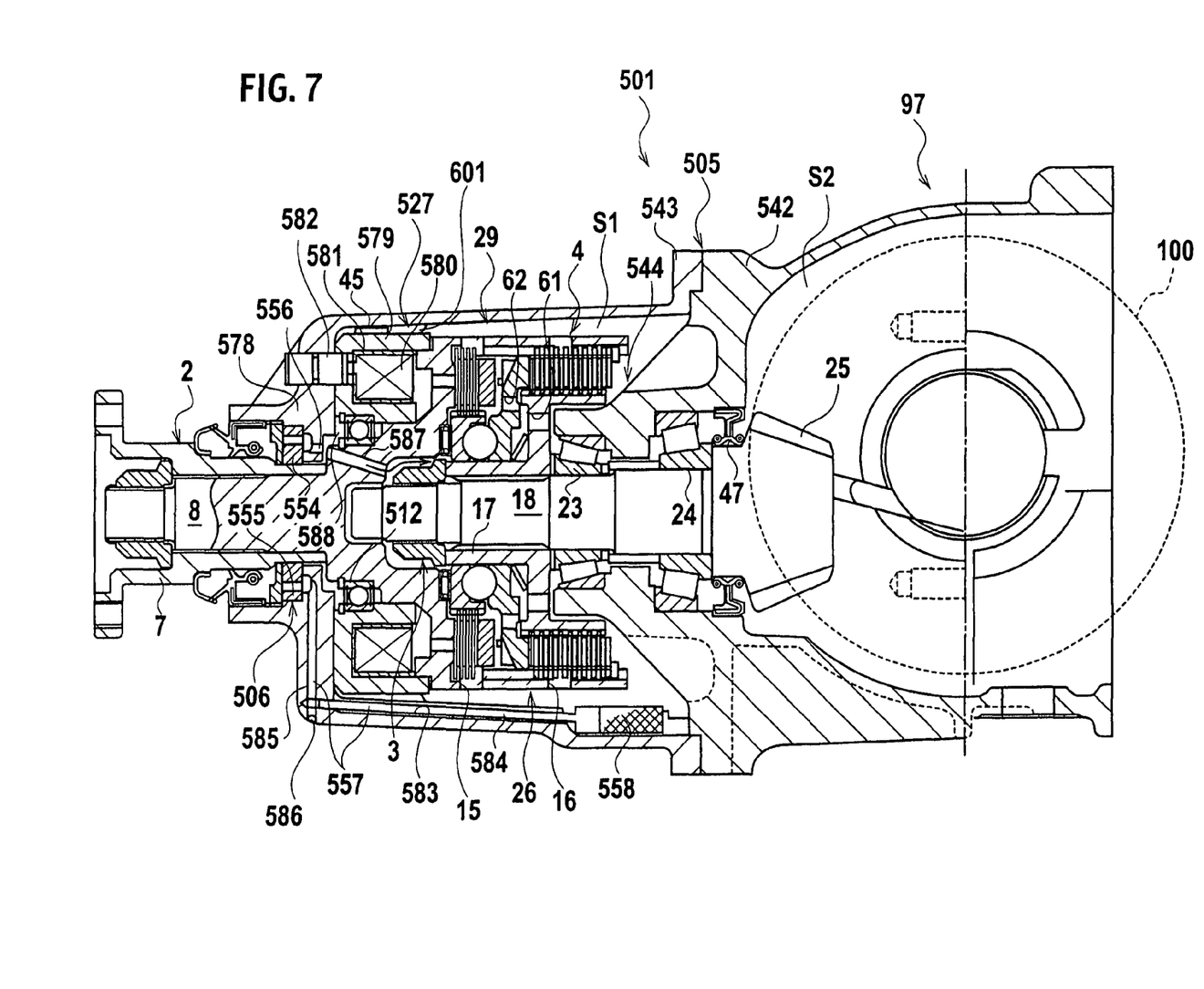
FIG. 7 is a sectional view of a driving-force transmission apparatus in accordance with a sixth embodiment of the present invention.

As shown in FIG. 7, a carrier cover 543 is formed with the end wall 578. The oil pump 506 is arranged on the inner circumferential side of the end wall 578. Again, the oil pump 506 is arranged so as to overlap with the end wall 578 at least partially in the radial direction. Note that the compartment seal 47 is arranged on the inner circumference of a cylindrical part 544 of a carrier body 542, which is close to the bearing 24. Additionally, a resin 581 is filled up between a yoke 579 of an electromagnet 527 and an electromagnet coil 580 for their resinous molding. Additionally, a coupler 582 is connected to the electromagnet 527. The coupler 582 is fixed to the carrier housing 505 and also formed in one body with the resin 581. In addition, a seal bearing 512 is arranged on an inner-diametrical side of the electromagnet 527.

The oil pump 506 is formed by a rotor 554 and a stator 555. The rotor 554 is connected to the outer circumference of the flange 7 (the input-side rotating member 2) of the propeller shaft and is rotated by the rotation of the flange 7 of the propeller shaft integrally. The stator 555 is fixed on the inner circumference of an end wall 578 of a carrier cover 543 by means of screwing and clamping. Further, a strainer 558 is arranged in a lower part of the carrier cover 543. The strainer 558 is connected to a resin pipe 584 accommodated in a groove 583 formed in the lower part of the carrier cover 543. The resin pipe 584 is communicated with a hole 585 formed in the carrier cover 543, providing a suction passage 557. The suction passage 557 formed in the carrier cover 543 has one end connected to the oil pump 506 and the other end sealed up with a seal plug 586. In the carrier cover 543, additionally, a discharge passage 556 is formed in an upper part of the end wall 578. The discharge passage 556 has its opening side adjoining an oil flow path (lubricating passage) 587 formed in the shaft 8. Note that a space defined by the end wall 578 of the carrier cover 543, a seal bearing 512 and the shaft 8 functions as an oil reservoir 588.

In the oil pump 506 like this, the oil is sucked from the strainer 558 through the suction passage 557 by the rotor 54 integrally rotated by the rotation of the input-side rotating member 2. The so-sucked oil is discharged through the discharge passage 556. As represented by an oil current shown with arrow of FIG. 7, the so-discharged oil is supplied to the main clutch 4 and the pilot clutch 29 through the oil flow passage 587. In this way, the main clutch 4 and the pilot clutch 29 are lubricated certainly.

In the driving-force transmission apparatus 501, since the oil pump 506 is arranged between the input-side rotating member 2 and the carrier housing 505, the oil pump 506 is always driven by the driving source. Thus, it is possible to supply the oil certainly wherever it is needed.

Again, as the oil pump 506 is arranged so as to overlap with the end wall 578 of the carrier housing 505 at least partially in the radial direction, it is possible to suppress an increase of the axial size of the apparatus.

If impossible to adopt such a suction route using the resin pipe 584 from the strainer 558 structurally, there may be formed an oil reservoir in the interior of the carrier cover 543 in the vicinity of the end of the suction passage 557. Then, it is possible to reduce a passage resistance of oil, allowing the oil pump 506 to function effectively while suppressing its suction loss.

Although the driving-force transmission apparatus of this embodiment is equipped with the oil pump that is driven by one of the rotating members in order to supply the friction clutch between the rotating members with oil, the structure of the present invention is also applicable to a general machine having an oil pump driven by a rotating member to supply constituent members with oil.

7$^{th}$. Embodiment

A driving-force transmission apparatus in accordance with the seventh embodiment will be explained with reference to FIG. 8.

[Structure of Electromagnetic Friction Clutch]

Figure 8:
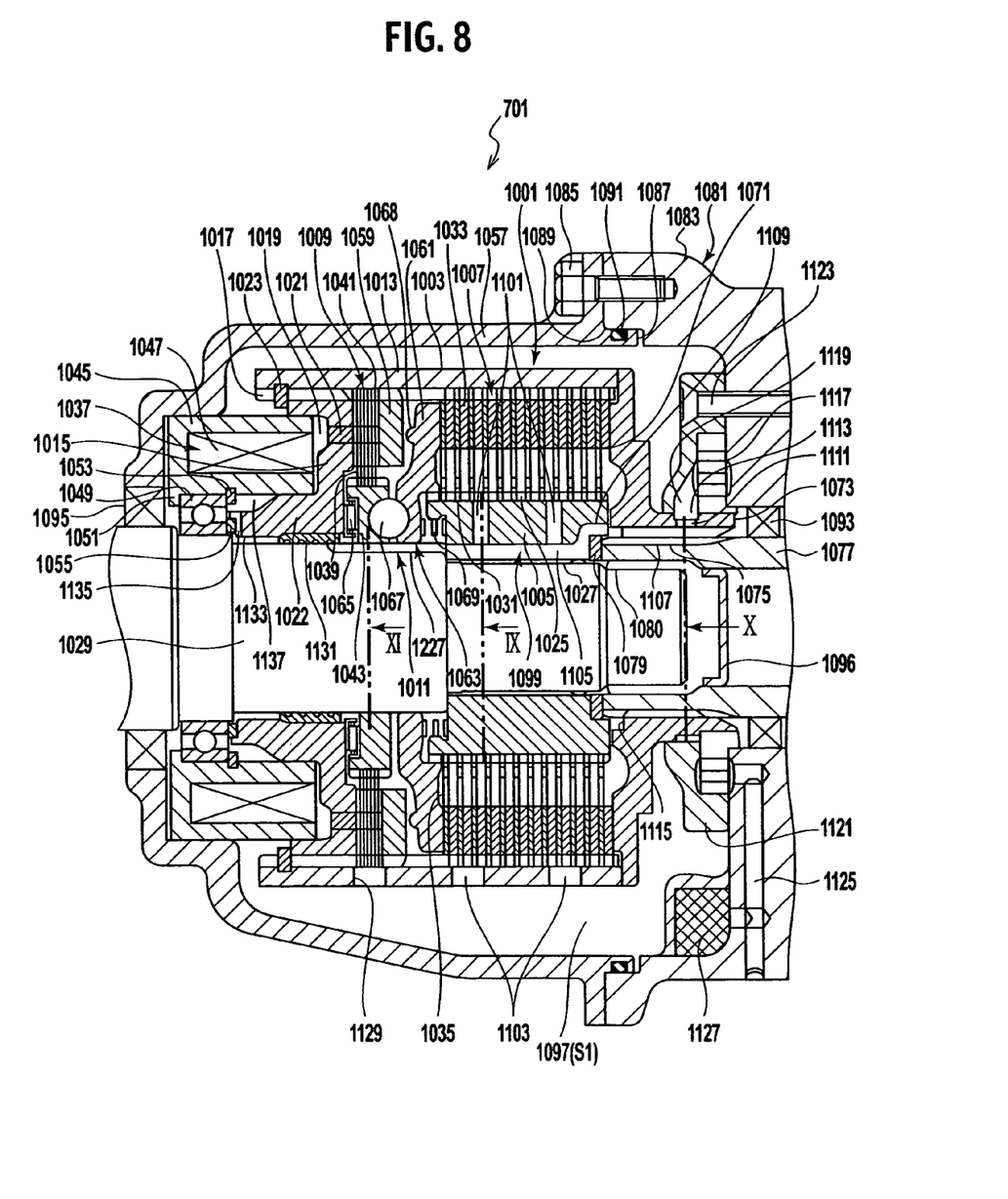
FIG. 8 is a sectional view of a driving-force transmission apparatus in accordance with a seventh embodiment of the present invention.

FIG. 8 is a sectional view of the driving-force transmission apparatus in accordance with the seventh embodiment of the present invention.

In the driving-force transmission apparatus 701, an electromagnetic friction clutch 1001 includes a clutch housing (output-side rotating member) 1003 and a clutch hub (input-side rotating member) 1005 as inside and outside clutch rotating members and further includes, between the clutch housing 1003 and the clutch hub 1005, a main clutch 1007, a pilot clutch 1009 and pressing means 1011.

The clutch housing 1003 includes a housing body 1013 and a rotor 1015. The housing body 1013 is provided with an inner spline 1017 for the main clutch and the pilot clutch.

The rotor 1015 is formed to be a rotor for the electromagnetic friction clutch 1001. An accommodation space part 1019 is arranged on the backside of the rotor 1015. The rotor 1015 is provided with a non-magnetic part 1021. The outer circumferential side of the rotor 1015 is spline-engaged with the inner spline 1017, while a bush 1022 press-fitted to the inner circumference of the rotor 1015 is fitted to an input rotating shaft 1029, which is an input-side rotating member as one of the input/output-side rotating members, so as to allow a relative rotation therebetween. At one end of the clutch housing 1013, a snap ring 1023 is attached to an inner circumference of the end in order to prevent the rotor 1015 from sliding out of the clutch housing body 1013.

The clutch hub 1005 is shaped to be hollow. The clutch hub 1005 is provided with a spline 1025 and an inner spline 1027. The clutch hub 1005 is spline-engaged, at the inner spline 1027, with the input rotating shaft (input-side rotating member) 1029, providing a joint capable of transmitting a torque therebetween.

The main clutch 1007 is interposed between the clutch housing 1003 and the clutch hub 1005 to adjust a transmission torque corresponding to application/cancellation of pressure. The main clutch 1007 is formed by a frictional multiplate clutch and comprises a plurality of inner plates 1031 and a plurality of outer plates 1033, both of which are arranged alternately. The inner plate 1031 is provided with holes 1035 at predetermined intervals in the circumferential direction. The inner plates 1031 are spline-engaged with the spline 1025 of the clutch hub 1005. The outer plates 1033 are spline-engaged with the inner spline 1017 of the housing body 1013. Note that the clutch hub 1005 may be molded integrally with the input-side rotating member 1029. In this case, the inner plates 1031 would be spline-engaged with such an integral molding member and further formed with axial passages and radial passages mentioned later.

The pilot clutch 1009 is an element to provide an origin to fasten the main clutch 1007 and to be fastened by an electromagnet 1037 as an actuator. The pilot clutch 1009 includes, as clutch plates, a plurality of inner plates 1039 and a plurality of outer plates 1041, both of which are arranged alternately.

The inner plates 1039 are spline-engaged with the outer circumference of a cam plate 1043 of the pressing means 1011, while the outer plates 1041 are spline-engaged with the inner spline 1017 of the clutch housing 1003.

The electromagnet 1037 adjoins the accommodation space part 1019. The electromagnet 1037 generates an electromagnetic force corresponding to a current under control and includes a core 1045 carrying coils 1047. In the core 1045, its inner circumference is supported by the outer circumference of the input rotating shaft 1029 through a ball bearing 1049 so as to allow a relative rotation between the core 1045 and the rotating shaft 1029. The core 1045 is provided, at its end, with a stopper projecting part 1051 that engages with one side of the ball bearing 1049. While, the other end of the ball bearing 1049 engages with a stopper ring 1053 attached to the inner circumference of the core 1045. A spacer 1055 is interposed between the ball bearing 1049 and the rotor 1015. The outer circumference of the core 1045 is fittingly fixed to a later-mentioned carrier housing cover 1057 and is supported by the same cover 1057 non-rotatably.

Note that the electromagnet 1037 is electrically connected to both a power source and a controller in a vehicle body through a harness penetrating the carrier housing cover 107.

An armature 1059 is arranged so as to interpose the rotor 1015 and the pilot clutch 109 against the electromagnet 1037. The armature 1059 is spline-connected to the inner spline 1017 of the clutch housing 1003. The armature 1059 is movable toward the rotor 1015 so that a magnetic force of the electromagnet 1037 attracts the armature 1059 to fasten the pilot clutch 1009.

The pressing means 1011 is composed of a cam plate 1043, a press plate 1061 and a cam mechanism 1063 between the cam plate 1043 and the press plate 1061.

The backside of the cam plate 1043 comes into contact with the rotor 1015 through a needle bearing 1065. A cam ball 1067 is interposed between a cam surface of the cam plate 1043 and a cam surface of the press plate 1061. The press plate 1061 has a projection 1068 opposing the armature 1059 and is spline-engaged with an end of the spline 1025 of the clutch hub 1005. A return spring 1069 is interposed between the press plate 1061 and the clutch hub 1005.

In the clutch housing 1003, the housing body 1013 is provided with an end plate part 1071 which is subjected to a fastening force of the main clutch 1007. The end plate part 1071 is provided, on its inner circumferential side, with a boss part 1073. The boss part 1073 is provided with an inner spline 1075 which is spline-fitted to a hollow output rotating shaft 1077 as the output rotating member.

The output rotating shaft 1077, which is the other one of the input/output rotating members, abuts on the clutch hub 1005 through a bush 1079 and fitted to the input rotating shaft 1029 through a bush 1080.

The electromagnetic friction clutch 1001 is accommodated in a carrier housing 1081 as the stationary member. The carrier housing 1081 includes a carrier housing body 1083 and the carrier housing cover 1057. In the carrier housing body 1083, there is accommodated and supported another torque transmission apparatus which is dynamically successive to the driving-force transmission apparatus and is cooperatively connected to the output rotating shaft (the output-side rotating member) 1077.

The carrier housing cover 1057 is fastened to the carrier housing body 1083 by a bolt 1085. In the carrier housing cover 1057, a fitting margin 1087 is formed circumferentially and is fitted to a fitting recess 1089 formed in the carrier housing body 1083 circumferentially. The fitting margin 1087 carries an O-ring 1091 having a seal function as closure means. The O-ring 1091 sticks fact to the fitting recess 1089 to prevent lubricant from leaking out of the carrier housing.

[Lubricating Structure]

Oil seals 1093, 1095 (the closure means) are interposed between the carrier housing body 1083 of the carrier housing 1081 and the output rotating shaft 1077 and between the carrier housing cover 1057 and the input rotating shaft 1029, respectively. A closing member 1096 (the closure means) is attached to an axial center part of the output rotating shaft 1077.

By the closure means arranged between the rotating members, between the rotating member and the stationary member and also between the stationary members, there is defined an enclosed space (lubricant accommodation space) 1097 (S1) which accommodates the clutch housing 1003, the clutch hub 1005 and the main clutch 1005 etc. in a sealed manner and into which oil as the lubricant is charged. In case of this embodiment, the closure means is accomplished by the O-ring 1091, the oil seals 1093, 1095 and the closing member 1096.

In the clutch hub 1005 and the clutch housing 1003, a lubricating passage 1099 is provided in order to allow the main clutch 1007 to be supplied with oil.

The lubricating passage 1099 comprises radial passages 1101, 1103 which are formed in the clutch hub 1005 and the clutch housing 1003 in the radial direction for radial movement of oil, and axial passages 1105, 1107 which introduce the oil into the radial passages 1101, 1103 of the clutch hub 1005 from the axial direction.

Figure 9:
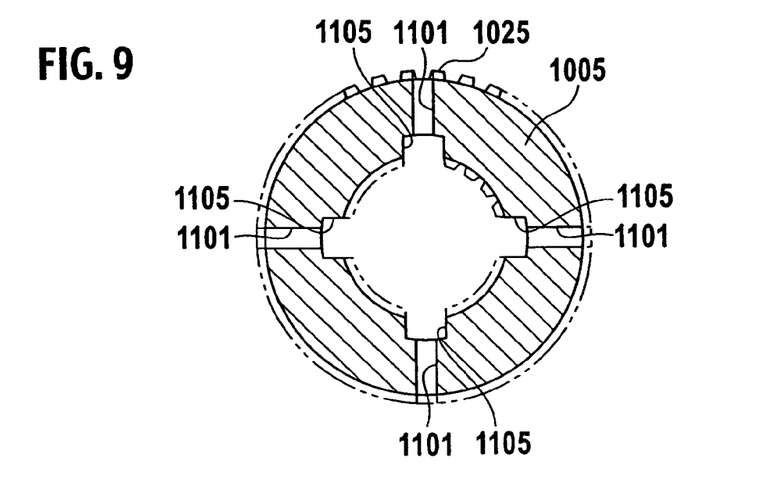
FIG. 9 is a view viewed from a direction of arrow IX-IX.
Figure 10:
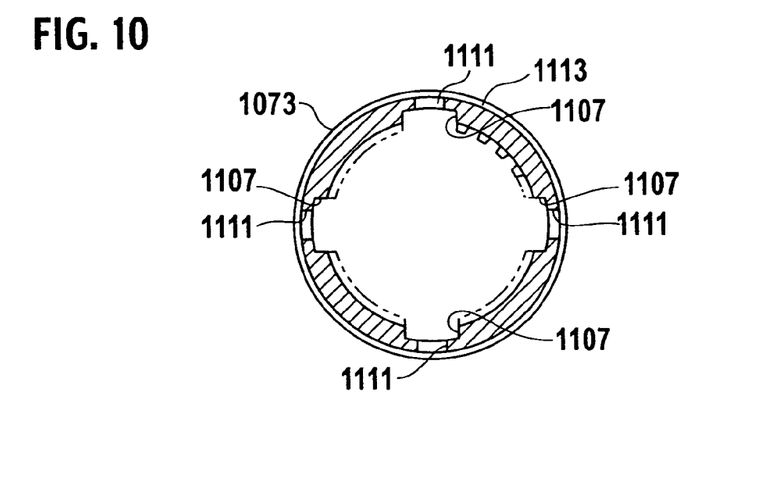
FIG. 10 is a view viewed from a direction of arrow X-X.
Figure 11:
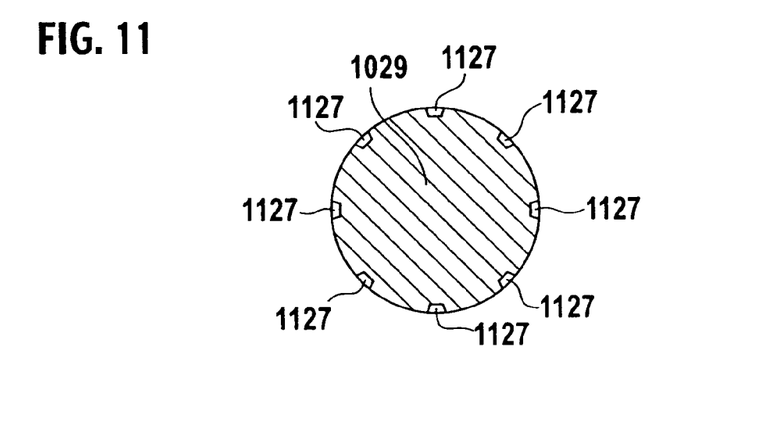
FIG. 11 is a view viewed from a direction of arrow XI-XI.

FIG. 9 is a view viewed from a direction of arrow IX-IX. FIG. 10 is a view viewed from a direction of arrow X-X. FIG. 11 is a view viewed from a direction of arrow XI-XI.

As shown in FIGS. 8 and 9, the radial passages 1101 are arranged at four positions in the circumferential direction at intervals of 90 degrees and are arranged at two positions in the axial direction with an interval. The radial passages 1101 are communicated, on the inner circumferential side of the clutch hub 1005, with the axial passage 1105 and is opened, on the outer circumferential side, to the inner circumferential side of the main clutch 1007. The radial passages 1103 penetrate from the outer circumference of the main clutch 1007 to the enclosed space 1097. In the axial direction, the radial passages 1103 are arranged at two positions corresponding to the radial passages 1101. In the circumferential direction, the radial passages 1103 are formed at regular intervals, for example, corresponding to the radial passages 1101.

The axial passages 1105 are formed between the clutch hub 1005 and the clutch housing 1003. In this embodiment, they are formed so as to penetrate the inner circumference of the clutch hub 1005 in the axial direction and are arranged at four positions in the circumferential direction at intervals of 90 degrees. An end 1109 of each axial passage 1105 is diametrically enlarged to the outer circumferential side of the bush 1079.

As shown in FIGS. 8 and 10, the axial passages 1107 are formed between the boss part 1072 of the end plate part 1071 and the output rotating shaft 1077. In this embodiment, they are formed so as to penetrate the inner circumference of the boss part 1073 in the axial direction. For example, they are arranged at four positions in the circumferential direction at intervals of 90 degrees. Each axial passage 1107 is communicated with an annular groove 1113 on the outer circumferential side of the axial passage 1107 through a through-hole 1111. At an end of the axial passage 1107 on the side of the clutch hub 1005, a concave part 1115 is formed in the inner circumference of the end plate part 1071 circumferentially. The concave part 115 is formed so as to have an inner diameter similar to the inner diameter of the end 1109 with the object of smoothing an axial flowage of oil.

The annular groove 1113 is communicated with a discharge space (lubricating passage) 1119 formed outside a discharge opening of a gear pump 1117 being just a pump. The discharge space 1119 is formed by a pump casing 1121. The pump casing 1121 is fixed to the carrier housing body 1083 by screws 1123 under condition that the inner circumference of the pump casing 1121 comes close to or contacts the outer circumferential surface of the boss part 1073 so as to allow a relative rotation therebetween.

The gear pump 1117 has a suction port communicated with a suction passage 1125 formed in the carrier housing body 1083. The suction passage 1125 is formed in communication with a strainer 1127. The strainer 1127 is communicated with an enclosed space 1097.

As shown in FIGS. 8 and 11, the lubricating passage 1099 includes second axial passages 1227 communicated with the axial passages 1105 to introduce lubricant into the inner circumferential side of the pressing means 1011 and second radial passages 1129 arranged on the outer circumferential side of the pressing means 1011 and formed in the clutch housing 1003 in the radial direction.

Between the cam plate 1043/the press plate 1061 and the input rotating shaft 1029, in this embodiment, the axial passages 1127 are formed on the outer circumference of the input rotating shaft 1029 at eight positions in the circumferential direction at intervals of 45 degrees. The axial passages 1127 are formed, at their one ends, so as to oppose and communicate with the axial passages 1105. The other ends of the axial passages 1127 are situated next to the inner circumference of the bush 1022.

Penetrating from the outer circumferential side of the pilot clutch 1009 to the enclosed space 1097, the radial passages 1129 are formed at regular intervals in the circumferential direction, for example, at four positions at intervals of 90 degrees.

The bush 1022 is provided, on its inner circumference, with a spiral groove 1131 communicating with the axial passages 1127. Between the inner circumference of the rotor 1015 and the outer circumference of the input rotating shaft 1029, a third axial passage 1133 is defined by an interval therebetween. Third radial passages 1135 are formed on an end surface of the rotor 1015 on its inner circumferential side and are communicated with the third axial passage 1133. The third radial passages 1135 are formed in the rotor 1015 at regular intervals in the circumferential direction, for example, at eight positions at intervals of 45 degrees. The third radial passages 1135 are communicated with a space 1137 on the outer circumferential side of the passages 1135. The space 1137 is communicated with a ball bearing 1049. Again, the space 1137 is communicated with the enclosed space 1097 through a gap between the core 1045 and the rotor 1015.

[Operation of Electromagnetic Friction Clutch]

By power distribution control for the electromagnet 1037, there is formed a magnetic path among the rotor 1015, the core 1045 and the armature 1059. Due to the formation of this magnetic path, the armature 1059 is attracted to the rotor 1015, so that the pilot clutch 1009 is fastened. With this fastening, the cam plate 1043 engages with the clutch housing 1003 in the rotating direction.

While, when a torque is inputted from the input rotating shaft 1029, the cam plate 1043 is rotationally displaced in relation to the press plate 1061 spline-engaged with clutch hub 1005, so that the cam ball 1067 runs on the cam surface. This running-on of the cam ball 1067 causes the cam mechanism 1063 to operates to produce a thrust force.

The above thrust force is transmitted to the rotor 1015 through the needle bearing 1065, while a thrust force as the reaction force is exerted to the press plate 1061. With an action of this thrust force, the press plate 1061 moves and fastens the main clutch 1007 to the end plate part 1071. Corresponding to the fastening force, the main clutch 1007 transmits the torque from the clutch hub 1005 to the clutch housing 1003.

The torque transmitted to the clutch housing 1003 is transmitted from the boss part 1073 of the end plate part 1071 to the output rotating shaft 1077. Thus, the torque is transmitted to a power transmission apparatus in the carrier housing body 1083.

[Lubrication]

Since the electromagnetic friction clutch 1001 rotates in the enclosed space 1097, the oil in the enclosed space 1097 is scooped up to make it possible to lubricate respective parts.

Further, with the rotation of the clutch housing 1003, the boss part 1073 is rotated to drive the gear pump 1117. With the drive of the gear pump 1117, a suction force is produced. Consequently, the oil in the enclosed space 1097 is sucked in through the strainer 1127. Then, the so-sucked oil flows from the sucking passage 1125 to the gear pump 1117 and is discharged from the discharge port into the discharge space 1119.

The oil in the discharge space 1119 pervades in the circumferential direction due to the annular groove 1113 and is transferred from the through-holes 1111 to the axial passages 1107. Then, the oil in the axial passages 1107 is transferred to the axial passages 1105 through the concave part 1115 and the ends 1109 of the axial passages 1105.

Due to a pressure generated in the gear pump 1117 and a centrifugal force by the rotation of the clutch hub 1005, the oil in the axial passages 1105 moves in the radial passages 1101 toward the outer circumferential side and is supplied to the main clutch 1007, allowing the main clutch 1007 to be lubricated.

The oil lubricating the main clutch 1007 is returned to the enclosed space 1097 through the radial passages 1103.

The oil transferred to the axial passages 1105 is also transferred to the second axial passages 1127 and is supplied from the second axial passages 1127 to the cam mechanism 1063, the needle bearing 1065 and the pilot clutch 1009 etc. due to a centrifugal force, accomplishing a lubrication of respective parts. The oil after lubricating the parts is returned into the enclosed space 1097 through the second radial passages 1129.

When a relative rotation is produced between the rotor 1015 and the input rotating shaft 1029, for example, at the initial stage of fastening motion, the oil sent to the axial passages 1127 is sucked by the action of the spiral groove 1131 and is transferred to the third axial passage 1133. The oil in the third axial passage 1133 moves in the third axial passages 1135 toward the outer circumferential side and reaches the space 1137. Upon lubricating the ball bearing 1049 etc., the oil in the space 1137 is returned to the enclosed space 1097 through the gap between the core 1045 and the rotor 1015.

In this way, by the circulation of oil, it is possible to lubricate the respective parts certainly and smoothly.

In addition, since the carrier housing 1081 allows the enclosed space 1097 for oil to be enlarged, it is possible to restrain an increase in size of the electromagnetic friction clutch 1001.

Since the lubricating passage 1099 comprises the radial passages 1101 formed in the clutch housing 1003 and the clutch hub 1005 in the radial direction to move the lubricant in the radial direction and the axial passages 1105, 1107 for introducing the oil into the radial passages 1101 in the clutch hub 1005 in the axial direction, the rotations of the clutch housing 1003 and the clutch hub 1005 allow the oil inside the carrier housing cover 1057 led to the axial passages 1105, 1107 to move in the radial passages 1101 due to the centrifugal force. Accordingly, it is possible to supply the main clutch 1007 with the oil certainly and smoothly.

The axial passages 1105 are arranged between the clutch hub 1005 and the input rotating shaft 1029 fittingly connected to the clutch hub 1005, while the axial passages 1107 are arranged between the clutch housing 1003 and the output rotating shaft 1077 fittingly connected to the clutch housing 1003. Therefore, the oil in the carrier housing cover 1057 can be transferred from an interval between the clutch housing 1003 and the output rotating shaft 1077 fittingly connected to the clutch housing 1003 to the main clutch 1007 through the intermediary of an interval between the clutch hub 1005 and the input rotating shaft 1029 fittingly connected to the clutch hub 1005, certainly and smoothly.

Owing to the provision of the gear pump 1117 for oil-feeding in the lubricating passage 1099, it is possible to send the oil in the carrier housing cover 1057 to the lubricating passage 1099 by the operation of the gear pump 1117, certainly.

Since the lubricating passage 1099 includes the second axial passages 1127 communicated with the axial passages 1105 to introduce the oil into the inner circumferential side of the press means 1011 and the second radial passages 1129 arranged on the outer circumferential side of the press means 1011 and also formed in the clutch housing 1003 in the radial direction, it is possible to lead the lubricant to the press means 1011 via the second axial passages 1127 and the second radial passages 1129 certainly and smoothly.

[Others]

In this embodiment, it is also possible to eliminate the axial passages 1107 and the gear pump 1117 on condition that the axial passages 1105 could be supplied with oil. Then, assuming that a corresponding part to the discharge space 1119 is a reservoir portion for lubricant, it is possible to introduce the lubricant into the axial passages due to either centrifugal-pump effect by a rotation of the coupling or lubricant's own weight.

The second axial passages 1127 and the second radial passages 1129, the spiral groove 1131, the third axial passage 1133 and the third radial passages 1135 may be eliminated according to the situation, appropriately.

The input/output relationship between the input/output rotating shafts 1029, 1077 may be reversed.

Besides the actuator using an electromagnetic force, additionally, there may be appropriately adopted other actuators, for example, actuator using a hydraulic cylinder piston, actuator using a mechanism for converting rotations of a motor into an axial thrust force and so on.

INDUSTRIAL APPLICABILITY

As obvious from the above descriptions, the driving-force transmission apparatus of the present invention has an industrial applicability as follows.

(1) Since the apparatus has an oil pump that is driven by one of rotating members in order to supply a friction clutch with oil, it is possible to supply the friction clutch with oil certainly, whereby both abrasion and oil-short about the friction clutch can be suppressed. Thus, the driving-force transmission apparatus is improved in terms of both lubricating property and cooling capability, allowing the apparatus' stability in performance and durability to be improved.

(2) Since the oil pump includes the driving part driven by one of the rotating members and the fixed part fixed to the stationary member, the oil pump is driven by an absolute number of revolutions of the rotating member, allowing oil to be supplied corresponding to the drive of the rotating shaft. Additionally, it is possible to supply the friction clutch with oil actively.

(3) Since it is easy to form either an inner circumferential wall or an outer circumferential wall on the cylindrical part of the stationary member, it is possible to arrange and fix the oil pump with ease.

(4) Since the oil pump is arranged against the tip side of the cylindrical part, the cylindrical part is provided, on the tip side, with an opening. Thus, the formation of this opening facilitates an attachment of the oil pump without being obstructed by the rotating member and the stationary member.

(5) Since a space for the oil pump is defined between the bearings in pairs, it is possible to suppress an increase of the axial size of the apparatus due to the utilization of a space that has been a dead space heretofore.

(6) Since the oil pump also functions as a bearing, it is possible to supply the friction clutch with oil easily. In addition, with a reduction in the number of components, it is possible to suppress a rising of manufacturing cost to the utmost.

(7) Since the oil accommodation space defined by the stationary member is compartmentalized by the compartment seal and additionally, the oil pump is disposed in the oil accommodation space including of the friction clutch, it is possible to define a volume of the accommodation space on the side of the friction clutch and also possible to stabilize the oil supply for the friction clutch while excluding the influence of variations in the quantity of oil on the side of the driving-force distributing mechanism.

(8) Since the oil pump is arranged between the input-side rotating member and the stationary member, the oil pump is always driven by the driving source. Thus, it is possible to supply oil certainly as occasion demands.

(9) Since the oil pump is arranged so as to overlap with the end wall of the stationary member at least partially in the radial direction, it is possible to suppress an increase of the axial size of the apparatus.

The invention claimed is:

1. A driving-force transmission apparatus comprising:
   an input-side rotating member driven by a driving source;
   an output-side rotating member having a coaxial structure with the input-side rotating member;
   a friction clutch arranged between the input-side rotating member and the output-side rotating member;
   a stationary member having a coaxial structure with the input-side rotating member and being capable of accommodating the input-side rotating member, the output-side rotating member and the friction clutch;
   a lubricant accommodation space formed in the stationary member; and
   a pump for supplying the friction clutch with lubricant, wherein
   the stationary member has a cylindrical part for holding a bearing part supporting the output-side rotating member, and the pump is arranged on an inner circumferential side of the cylindrical part,
   wherein the bearing part consists of a pair of bearings disposed in an axial direction of the cylindrical part, and the pump is arranged between the bearings, and
   wherein the cylindrical part has a lubricant conductive passage formed therein between the bearings, for introducing the lubricant into the pump.

2. The driving-force transmission apparatus of claim 1, wherein
   the pump includes a driving part driven by one of the input-side rotating member and the output-side rotating member and a fixed part fixed to the stationary member.

3. The driving-force transmission apparatus of claim 1, further comprising a seal member which is arranged between the stationary member and the output-side rotating member to divide the lubricant accommodation space into a first lubricant accommodation space to arrange the friction clutch therein and a second lubricant accommodation space, wherein the pump is arranged in the first lubricant accommodation space.

4. The driving-force transmission apparatus of claim 1, further comprising a first seal member arranged between the input-side rotating member and the stationary member and a second seal member arranged between the output-side rotating member and the stationary member, wherein
   the first seal member and the second seal member compart the lubricant accommodation space;
   the pump is arranged between the output-side rotating member and the stationary member; and
   the output-side rotating member drives an input member for driving a driving-force distributing mechanism between left and right wheels of a vehicle.

5. The driving-force transmission apparatus of claim 1, further comprising an axial lubricating passage which is formed in a rotating shaft-center part of the output-side rotating member along an axial direction thereof and is communicated with a discharging passage of the pump to supply the friction clutch with the lubricant.

6. The driving-force transmission apparatus of claim 5, further comprising a radial lubricating passage which is formed in the output-side rotating member along a radial direction thereof and is communicated with the axial lubricating passage to supply the friction clutch with the lubricant.

7. The driving-force transmission apparatus of claim 1, further comprising an operating source for connecting and disconnecting the friction clutch, wherein
   the operating source is arranged on one side of the friction clutch in an axial direction of the driving-force transmission apparatus, while the pump is arranged on the other side of the friction clutch in the axial direction.

8. The driving-force transmission apparatus of claim 1, wherein
   the friction clutch includes an inside clutch rotating member connected to one of the input-side rotating member and the output-side rotating member so as to enable transmitting of a torque, an outside clutch rotating member connected to the other of the input-side rotating member and the output-side rotating member so as to enable transmitting of a torque and a clutch interposed between the clutch rotating members in pairs to adjust a transmission torque; and
   at least one of the inside clutch rotating member and the outside clutch rotating member is provided with a lubricating passage allowing the lubricant to be supplied to the clutch.

9. The driving-force transmission apparatus of claim 8, wherein the lubricating passage is formed in the inside clutch rotating member and the outside clutch rotating member in a radial direction thereof and includes a radial passage allowing the lubricant to move in the radial direction and an axial passage for introducing the lubricant into a radial direction of the inside clutch rotating member through an axial direction thereof.

10. The driving-force transmission apparatus of claim 8, wherein the clutch includes a multiplate clutch interposed between the inside clutch rotating member and the outside clutch rotating member to adjust the transmission torque by application and releasing of a pressure and an actuator for manipulating the pressure applied to the multiplate clutch.

11. The driving-force transmission apparatus of claim 10, wherein
   the multiplate clutch includes a main clutch and a pilot clutch providing an origin to fasten the main clutch; and
   the actuator comprises pressing means which is operated due to a fastening of the main clutch and which transmits a pressure originating in a fastening force of the pilot clutch to the main clutch.

12. The driving-force transmission apparatus of claim 11, further comprising an axial passage formed in an inner circumferential side of the pressing means to introduce the lubricant into the lubricating passage and a radial passage formed in one of the input-side rotating member and the output-side rotating member to introduce the lubricant into the axial passage.

* * * * *